INVENTOR.
BRUCE H. BETTCHER

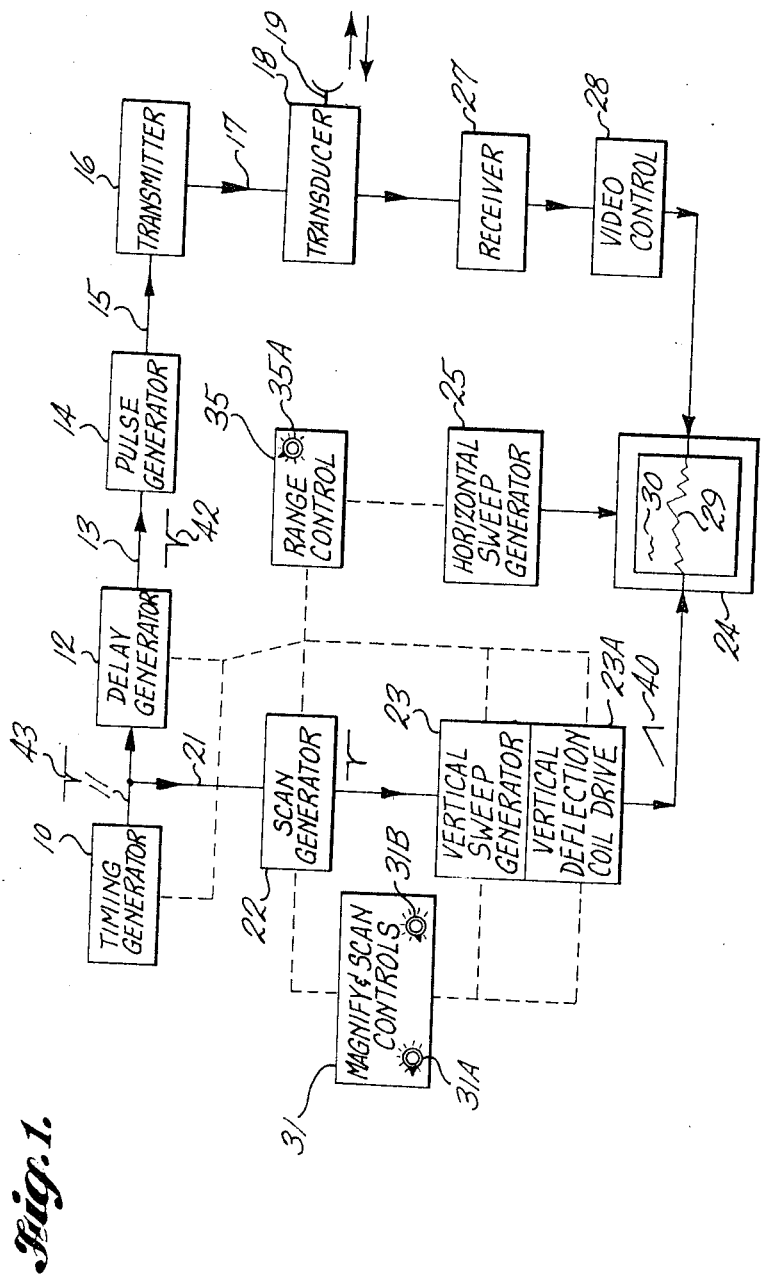

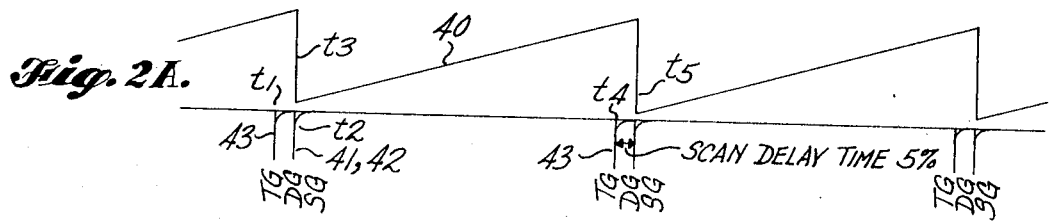
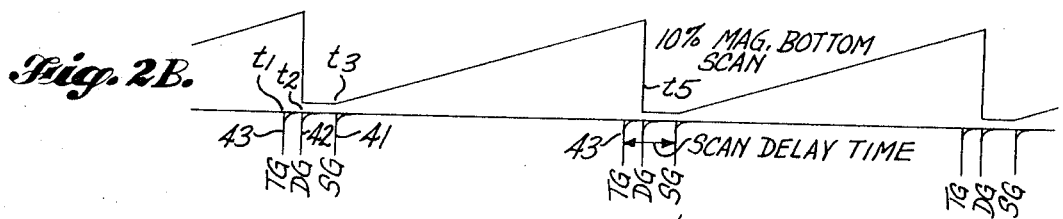
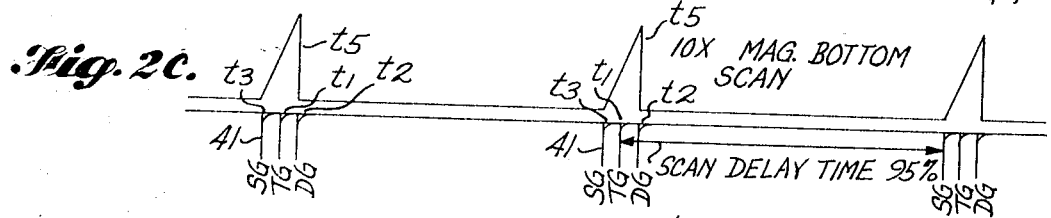
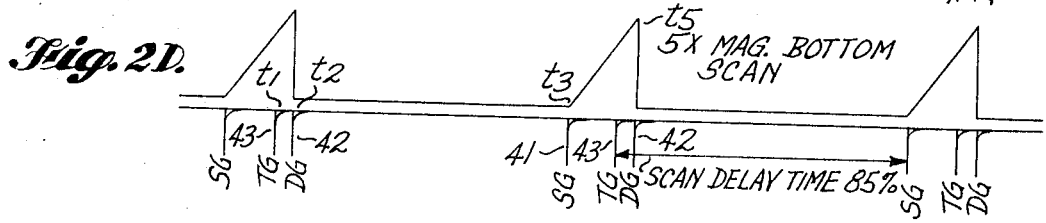
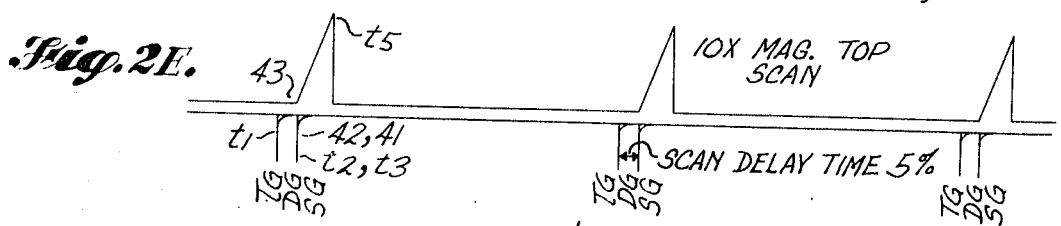
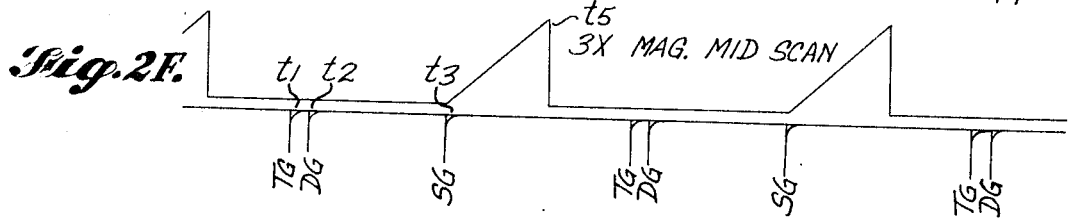

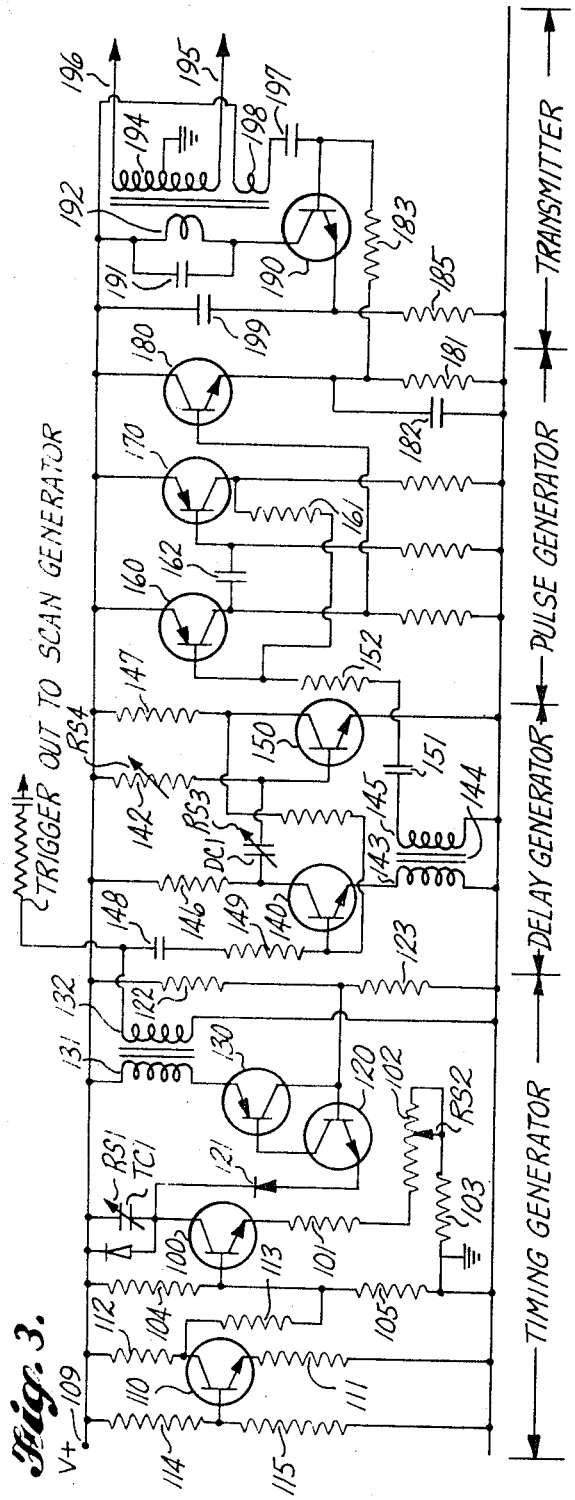
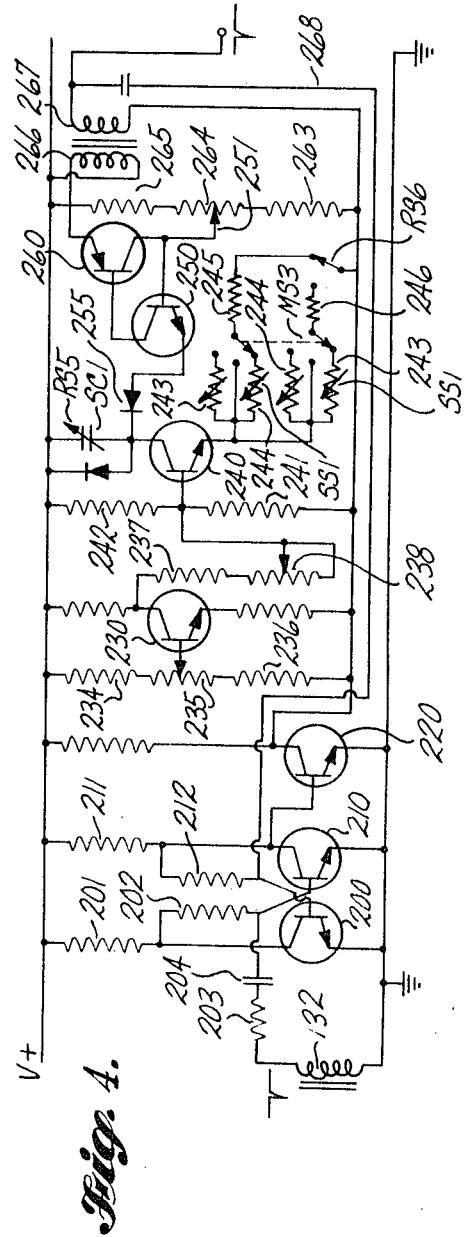
Fig. 3.
Fig. 4.
INVENTOR.
BRUCE H. BETTCHER
ATTORNEYS

ATTORNEYS

United States Patent Office 3,447,123
Patented May 27, 1969

3,447,123
DETECTION AND DISPLAY SYSTEM
Bruce H. Bettcher, 2814 129th SE.,
Bellevue, Wash. 98004
Filed May 20, 1966, Ser. No. 551,578
Int. Cl. G01s 9/66
U.S. Cl. 340—1                          15 Claims

ABSTRACT OF THE DISCLOSURE

The present invention relates to detection and display systems in general and more particularly to an improved system for detecting the distance between a signal transmitter carried by a craft and the terrain over which the craft is located or moving and including means for providing an accurate and detailed presentation of information concerning the terrain as well as of any selected intermediate segment of the space between the craft and such terrain. The system includes circuitry for providing a magnified view of a selected portion of the volume of space between the craft and the terrain. Circuit details of the scan generator for the vertical sweep of an intensity modulated cathode ray tube display are provided, including means for varying the initiation and speed of the sweep to obtain magnification are disclosed. The application discloses systems for obtaining improved data regarding objects displaced from a ship or aircraft, and particularly to an improved display of such data. Specific circuit details are provided including the circuit details of an improved deflection coil circuit for a magnetic deflection cathode ray tube.

---

Figure 5:
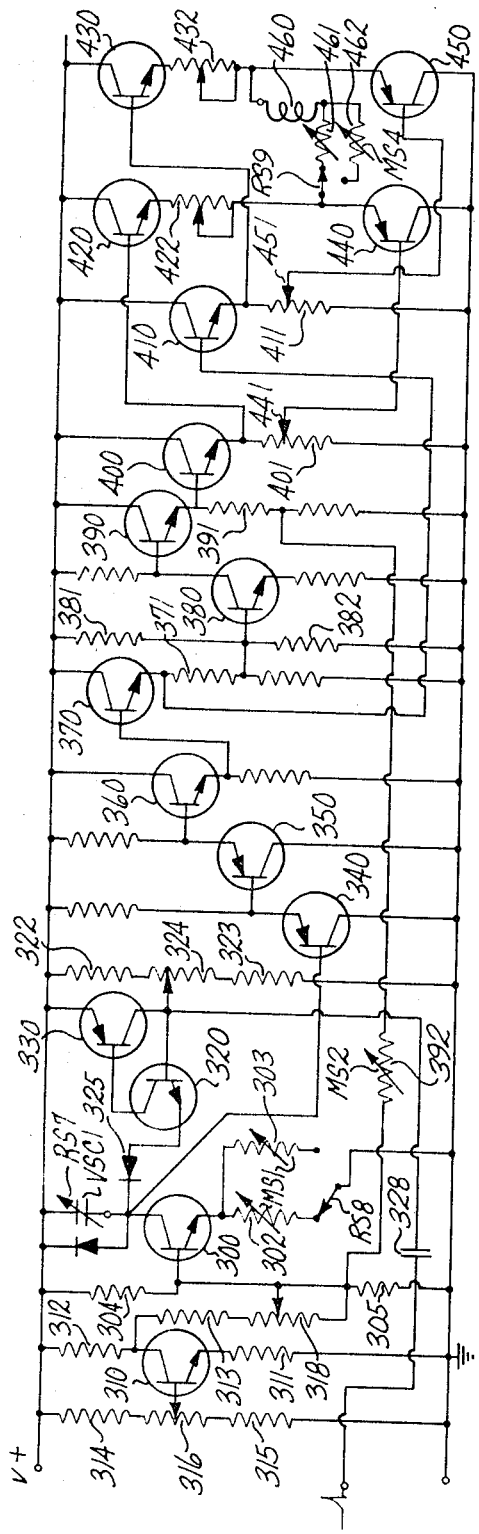

The systems and devices of the present invention are adapted primarily for use on aircraft making use of radar techniques for surveillance of the ground over which the plane is flying, and for use on ships using sonar techniques for obtaining data regarding the ocean floor or objects such as fish located in the water between a ship's hull and the ocean floor. For purpose of teaching the invention the apparatus will be described by reference to a preferred embodiment used for obtaining data regarding the ocean floor and underwater objects such as fish, but it will be obvious to those skilled in the art that the teachings are equally applicable to an aircraft ground surveillance system. Under water detection devices typically referred to as depth finders have come into importance in the fishing industry for detecting schools of fish, and also such devices have gained wide acceptance in the field of navigation and exploration of the bottom of the oceans. In many present day systems a compressional wave is initiated in the water by means of a conventional transducer with a timing circuit then being initiated in its operation so that the time required for the compressional wave to travel from the boat to the bottom and return to the boat can be accurately timed. A recorder of the type using electrosensitive paper is typically used in combination with an electrical stylus for recording on the paper an indication of the depth of the water beneath the boat. In such systems, the stylus either burns through the paper or does not burn through the paper and hence such systems are basically of the "go-no-go" type. As a result detailed information showing gradations in the bottom terrain as well as the presence of objects such as fish which do not return sufficient signal information to cause the stylus to burn through the paper are overlooked by the system. It would be advantageous to have the capability of providing to an operator several tones of signal information rather than information of the straightforward type provided by recording charts.

Cathode ray tube displays have been used to partially improve on the operation of systems based on recording charts, neon tube systems, etc., but even in such systems it is only possible to obtain range information of a dominant object (such as the bottom) with minor indications of objects lying between the bottom of the boat and the bottom of the ocean.

It is therefore an object of the present invention to provide an improved detection system. Another object of the present invention is to provide an underwater or airborne detection system for providing accurate depth or altitude information.

A further object of the present invention is to provide an improved terrain scanning system having the capability of indicating not only the altitude of a plane or depth of the water beneath a boat, but also of having the capability of providing a magnified view of any selected volume of the air between the plane and the ground or of the water lying between the bottom of the boat and the bottom of the ocean. Another object of the present invention is to provide an improved depth finder which permits the operator to readily magnify to a full scale illustration any selected volume of water lying between the transducer used for transmitting compressional waves and the bottom of the ocean over which the boat is located.

One object of the present invention is to provide an improved cathode ray tube display system for a detection apparatus and wherein an improved magnetic deflection system is provided. Another object of the invention is to provide a more stable and accurate timing system for providing long duration linearly calibrated timing signals through the use of an improved sawtooth wave generator having temperature compensation and leakage compensating feedback networks. A further object of the invention is to provide an improved magnetic deflection cathode ray tube system using solid-state components in circuit arrangements whereby linearity for the horizontal and vertical sweeps is achieved at various sweep rates.

The above as well as additional advantages and objects of the invention are achieved through the use of a system wherein a master timing generator serves to repeatedly trigger a pair of signal generators at recurring time intervals determined by the depth of the water in which the system is being used. The first signal generator, referred to as a delay generator, triggered by the timing generator serves to activate a pulse generator coupled with the transmitter which intiates the sound or compressional wave which is directed toward the bottom of the ocean beneath the ship. A scan generator coupled with a vertical sweep generator for the vertical deflection coils of a magnetic deflection cathode ray tube controls the vertical positioning of the beam in the cathode ray tube. By properly timing the initiation of the vertical sweep and by controlling the speed of the sweep the system makes it possible for an operator to "look at" any selected volume of water beneath the ship. A free-running horizontal sweep generator serves to move the electron beam at a uniform rate in a horizontal direction across the tube. When the compressional waves are reflected by the bottom of the ocean or by any intervening object, a portion of the energy is reflected back to the transducer. A conventional receiver is coupled with the transducer and with the video control circuit of the cathode ray tube so that the electron beam is intensity modulated in accordance with the reflected signal information. Since the vertical movement of the beam coincides with the time interval between transmission of a compressional wave and receipt of reflected energy, the electron beam makes a trace on the scope face indicating the location of given objects in the path of the transmitted energy. The result is that the scope displays what appears as a cross-sectional view of the bottom of the ocean in terms of depth of the bottom from the ship, and simultaneously displays the location of any object lying between the ocean floor and the transducer. The intensity of the display produced by each object is proportional to the strength of the reflected signal energy so that an indication is not only provided as to the depth of such objects but also as to the characteristics thereof in terms of relative brightness on the scope face. Thus schools of fish are readily seen on the scope face.

An important aspect of the system is the ability to permit an operator to expand the scale on the scope face and to simultaneously select the volume of water being displayed on the expanded scale. This is achieved through the use of a simple system of resistors and capacitors in the various timing circuits arranged such that after the transmitter has initiated the pulse of acoustic energy the start of the vertical sweep of the electron beam can be delayed to any selected time. In addition, the speed of the sweep can also be adjusted so that the movement of the beam from top to bottom of the scope can be made to take place in a selected length of time so that the magnification of the volume being viewed can be readily selected. Since the system is based on the time required for the acoustic energy to travel from the transducer to an object and back to the transducer, it is obvious that accurate timing circuits are of the utmost importance. In the system of the present invention extremely linear time scales are provided by novel sawtooth wave generators having the capability of providing relatively short as well as extremely long time bases. Thus, for example, the horizontal sweep control circuit of the present invention has the capability of providing a linear sweep rate lasting for as long as five minutes. Thus when used with a long persistence display tube, great depths can be accurately viewed and simultaneously a selected volume within such depth of water can be magnified on the scope face to thereby permit a fisherman or other user of the equipment to obtain detailed information as to objects lying at selected depths in the ocean. As is known in the art, a difficulty has been encountered through the use of magnetic deflection cathode ray tube displays when variations in the sweep time must be made to occur. Accordingly, the system of the present invention makes use of a novel drive system for the deflection coils such that linearity is retained and yet substantial variations in the total sweep time are achieved.

The above as well as additional advantages and objects of the present invention will be more clearly understood from the following description when read with reference to the accompanying drawings and wherein, FIGURE 1 is a block diagram showing the manner in which individual components are interconnected for carrying out the teachings of the invention; FIGURES 2A–2F are timing diagrams showing in detail the manner in which the system of the present invention permits the operator to magnify to a desired extent a selected volume of the water lying beneath the boat carrying the transducer which launches compressional waves in the water; FIGURE 3 is a more detailed schematic circuit diagram of the timing generator, delay generator, pulse generator, and transmitter of the system shown in FIGURE 1; FIGURE 4 is a schematic circuit diagram of the scan generator of FIGURE 1; and FIGURE 5 is a schematic circuit diagram of the vertical sweep generator shown in the block diagram of FIGURE 1.

Referring now to the drawings and in particular to FIGURE 1, the system will be seen to include a timing generator 10 having a signal output circuit 11 directly coupled with a delay generator 12 and a scan generator 22. The delay generator 12 upon receipt of a timing pulse from timing generator 10 serves to apply an output signal via circuit 13 to the pulse generator 14 after a selected time delay described hereinafter. The pulse generator 14 is in turn coupled by circuit 15 to a continuous wave transmitter 16. The continuous wave signals from transmitter 16 are applied through circuit 17 to a conventional transducer 18 which may be of the barium titanite type and including a directional device 19 for directing compressional wave energy into the water beneath the hull of a ship. In the system described herein the transducer 18 and the directional member 19 are situated in the bottom of the ship so that the compressional waves are directed substantially straight downwardly therefrom as the ship travels through the water.

The timing generator 10 also has a signal output circuit 21 which is coupled with the scan generator 22 which in turn controls the vertical sweep generator 23 for a magnetic deflection cathode ray tube 24. For reasons described hereinafter the vertical deflection coil drive circuitry 23A of the vertical sweep generator is shown as a separate component within the vertical sweep generator. As is common in the art, the vertical sweep generator serves to control the timing and speed of movement of the electron beam in the scope 24 in a vertical direction. Simultaneously therewith a horizontal sweep generator 25 serves to move the beam in a horizontal direction at a linear rate. The result is that the beam is moved in a horizontal direction at a uniform rate and is rapidly scanned in a vertical direction. Since the timing of the vertical movement of the beam is correlated with the transmission of compressional signals by the transducer 18, the display on the tube face is such that the location of an object reflecting energy back to the transducer 18 shows as a light spot on the tube face. To this end a conventional receiver 27 will be seen to be coupled with the transducer 18 and also coupled with the video control circuitry 28 for the cathode ray tube 24. As is well known in the art, the barium titanite transducer 18 upon receiving reflected energy causes a signal to be applied to the receiver 27 which in turn through video control circuit 28 causes the electron beam to be intensity modulated. Thus in the absence of a return signal the electron beam does not activate the phosphors on the scope face. When a return signal is received by the transducer, the intensity of the electron beam will be controlled in proportion to the return signal energy and, accordingly, as the beam moves downwardly on the scope face the intensity modulation thereof will result in a display of the depth of various objects lying between the transducer and the ocean floor (in those cases wherein the total sweep time for the vertical movement of the beam corresponds to the total time for transmission of signals of the transducer to the ocean floor and back to the transducer 18). In FIGURE 1, a line 29 is therefore illustrated on the scope face as representing the variations in depth of the ocean floor as the ship carrying the depth sounding system moves along through the water. A school of fish or similar objects would appear as shown at 30 as objects giving rise to reflection of signals from points lying intermediate the transducer and the ocean floor.

While information of the type illustrated in general on the scope face shown in FIGURE 1 is of value since a general indication of the bottom and location of objects 30 is provided, it would be most advantageous to have the capability of expanding the scale and simultaneously selecting a volume of the water containing the objects 30 giving rise to the general display (which might be referred to as a coarse display of the objects 30). The system of the present invention is capable of this advantageous characteristic in that the operator through very simple adjustments can cause the small volume of water containing the objects 30 to be displayed as a full scale display on the scope face. Thus it will be seen that a magnify and scan control unit 31 is coupled with the scan generator 22 and the vertical sweep generator 23 as well as with the vertical deflection coil drive 23A in the vertical sweep generator. The magnify and scan control unit 31 can be adjusted so that a delay in the occurrence of output signals provided by scan generator 22 to the vertical sweep generator 23 will occur. The delay is selected so that initiation of the vertical sweep occurs just as signals are being received from a selected depth lying within the total range for which the system is then set. Simultaneously with selecting initiation of the scan the magnify and scan control unit determines the rate at which the vertical sweep will occur. Thus if the vertical sweep is made to occur over a relatively long period of time, it will be seen that signals from a relatively great vertical depth of water will be received during each sweep of the beam in a vertical direction. In such operation relatively low magnification is achieved. If the vertical sweep generator is operated in a manner such that the beam is moved very rapidly down the tube face each sweep of the beam in the vertical direction will correspond to a very short signal receiving time interval and great magnification will be obtained.

The unit 31 is provided with a scan control knob 31A so that the operator is able to select a given vertical segment of water between the ship hull and the ocean floor which is to be magnified, and a magnify control knob 31B which through control of the vertical sweep generator determines the magnification of the view being displayed. The magnify control 31B also provides master control over the scan, as described hereinafter.

The system includes a range control 35 which is coupled with the timing generator, delay generator, scan generator, vertical sweep generator, vertical deflection coil drive, and the horizontal sweep generator in the manner described in greater detail hereinafter. The magnify and scan control unit 31 as well as the range control unit 35 serve to adjust resistors and capacitors in the various components with which they are coupled and, accordingly, each is shown as being coupled witht he associated units by means of the dotted lines leading from the respective units to the various signal generators. In one system the various adjustments under the control of one knob were accomplished through the use of ganged wafer switches.

In general, it can be said that the range control 35 serves to adjust the repetition rate of the master timing signals from the timing generator 10 so that the separation of adjacent timing signals is sufficiently great to permit a signal from the transducer 18 to depart from the ship, reach the ocean floor then beneath the ship, and return to the transducer before the succeeding timing generator signal causes another activation of the transducer 18 for transmission of a succeeding pulse. When the system is being used in shallow water the repetition rate of the timing generator is relatively high, whereas when the ship is located in deep water the repetition rate of the timing generator is lengthened. For similar reasons the sweep rate of the beam across the tube face is adjusted by the range control through adjustment of the repetition rate of the horizontal sweep generator 25. As described in detail hereinafter, the range control 35 also serves to adjust the delays possible by the scan generator in accordance with the depth of water or total range of the system at a given time. The range control 35A also determines the range of sweep speeds possible by the vertical sweep generator 23 when the magnify control 31B is adjusted. The manner in which these adjustments are made and the important results achieved thereby will be more clearly understood by reference to the timing diagrams now to be described.

Referring now to FIGURE 2, several wave-forms are shown in a timing diagram to illustrate the manner in which the system of FIGURE 1 operates. In FIGURE 2A a sawtooth current wave-form 40 from the vertical deflection coil drive 23A is shown. This current wave-form rises linearly with respect to time and is applied to the vertical beam control coils for controlling movement of the electron beam in the scope in the vertical direction. The time of the initiation of the vertical sweep is controlled by the occurrence of an output signal 41 from the scan generator 22. The occurrence of an output signal from the trandsucer 18 into the water is indicated by the occurrence of the output signal 42 from the delay generator 12. In each case, the scan generator and delay generator output signals are under the master control of the timing signals 43 from the timing generator 10. The wave-forms of FIGURE 2A are shown for the case when the system is operating without any magnification and with the time for the beam to move from top to bottom on the scope face corresponding to the maximum range between the transducer and the ocean floor. At time $t_1$ the timing generator 10 applies a pulse 43 to the delay generator 12 and to the scan generator 22. At time $t_2$ and after a time delay corresponding to the time interval $t_1-t_2$ the delay generator activates the transmitter 16 through the pulse generator 14. The scan generator also starts the vertical sweep generator 23 at a time $t_3$ which in FIGURE 2A is coincident with time $t_2$. Thus an acoustic wave is transmitted by the transducer 18 at the time when the wave-form 40 starts the electron beam for the scope downwardly. The total time for the beam to sweep downwardly and then retrace in FIGURE 2A is shown as $t_3-t_5$, the actual retrace occurring in a very small part of said time. If during the time when the beam moves downwardly a signal is provided by the receiver 27 to the video control circuit 28, the beam will be intensified in proportion to the return signal strength and an indication will be provided on the scope face that an object lying between the hull of the ship and the ocean floor has caused reflection of part of the transmitted acoustic energy. At time $t_4$ it will be seen that the timing generator 10 emits another pulse 43 so that at time $t_5$ the transmitter 16 and the vertical sweep are again activated. Sufficient time is provided between the times $t_1-t_3$ and $t_4-t_5$ to not only permit retrace of the beam but also to insure resetting of the various circuits.

Referring now to FIGURE 2B, the wave-forms are shown for the situation when the operator desires to magnify the bottom to a small extent (10% magnification in FIGURE 2B). As in the case of FIGURE 2A the timing generator 10 emits a pulse at time $t_1$ and the delay generator 12 triggers the transmitter 16 at the same time $t_2$ as in FIGURE 2A. However in the case of 10% bottom magnification, the start of the vertical sweep generator 23 at time $t_3$ is delayed by the scan generator 22. At the same time the magnify control 31B is adjusted so that the vertical sweep generator provides a speeded-up yet linear sweep. Thus it will be seen that the time $t_3-t_5$ in FIGURE 2B for the vertical sweep signal 40 to occur is 10% less than the time $t_3-t_5$ in the case of FIGURE 2A, with the initiation of beam travel being delayed to a time after the transmitter has been operated. As a result information concerning the upper 10% of the depth of water is ignored, while information concerning the remaining 90% still controls beam intensity during full scope travel of the beam. Hence 10% bottom magnification is achieved.

In FIGURE 2C the wave-forms are illustrated for the case when the magnify and scan control unit 31 has been adjusted to provide ten power magnification of the bottom with the range control 35 being set for the same range as in the cases of FIGURES 2A and 2B. Thus it will be seen that the time between adjacent timing generator pulses 43 is the same in each of FIGURES 2A, 2B and 2C and it will also be seen that the time interval $t_1-t_2$ for occurrence of the delay generator signal to activate the transmitter 16 remains constant. However, in FIGURE 2C the occurrence of a signal from the scan generator 22 at time $t_3$ is delayed to very near the end of the time available between adjacent timing pulses 43. Time $t_3$ will be seen to be delayed until 90% of the time between adjacent pulses by the transducer 18 has occurred. As a result the vertical sweep of the electron beam is delay until only the trailing 10% of the desired information is being received by receiver 27 and applied to the video control circuit 28. It should be noted that when the vertical sweep is initiated at $t_3$ of FIGURE 2C a very short time remains for complete sweep of the beam from top to bottom on the scope face and, accordingly, the wave-form 40 rises at a very steep angle. However the sweep of the beam is seen be completed within the allotted time and prior to the occurrence of the next signal from the delay generator 12. It is of importance to note that the system is arranged such that the maximum usable time intervals are made possible. For example, in the situation of ten power magnification illustrated in FIGURE 2C it will be seen that the beam reaches the bottom of the scope at time $t_5$ which is actually after occurrence of the next following timing signal 43.

In FIGURE 2D the wave-forms associated with the various signal generators when five power magnification of the bottom is desired are illustrated. Again, it is assumed that the range control 35 has remained unchanged and, accordingly, the timing generator output signals and delay generator output signals 43 and 42 still occur repeatedly at fixed times $t_1$ and $t_2$. Since the bottom is to be magnified with five power magnification, the scan generator output signal 41 is delayed for a time slightly less than in the case of FIGURE 2C. It will be seen that when the scan generator provides its signal 41 to the vertical sweep generator 23 at time $t_3$ the beam will start downwardly and will take twice as long for its travel from top to bottom as was the case in FIGURE 2C. During this time interval the receiver 27 will be providing information to the video control circuit 28 corresponding to the trailing 20% of the total time for receipt of information signals. Thus five power magnification of the bottom occurs. It should be noted that in each of the situations described the magnify and scan control unit 31 serves to adjust the time of occurrence of the output signal 41 from the scan generator 22 and also the speed with which the beam is swept down the scope by controlling the sweep generator 23. The scan generator control 31A not only determines the segment of water to be scanned on an expanded scale but also adjusts the upper limit of the time available for beam sweep. A linear time base for the beam sweep is of importance in all cases and thus the magnify and scan control unit 31 serves to adjust circuit constants within the vertical deflection coil drive to accommodate the well known nonlinearity introduced in a magnetic coil deflection system when one attempts to alter the deflection speed.

In FIGURE 2E the case for ten power magnification of the top of the water being scanned is illustrated. Thus as in the previous cases the timing generator and delay generator output signals occur at the same times $t_1$ and $t_2$. Simultaneous with occurrence of the delay generator signal 42 the scan generator output signal 41 is applied to the vertical sweep generator 23 so that the beam starts downwardly at the same time as the transmission of a signal from the transducer 18. Thus the information received by the receiver 27 starting from the time of initiation of the acoustic wave by the transducer 18 will be effective to intensity modulate the electron beam. Since ten power magnification of the top volume of water is desired, the electron beam is swept very rapidly from top to bottom with the same occurring during 10% of the total time available. Thus it will be seen in FIGURE 2E that by time $t_5$ the beam has been swept from top to bottom and thus only those signals received by the receiver 27 immediately following transmission of the acoustic energy by the transducer 18 will be displayed. Ten power magnification of the top is therefore provided. In each instance it should be noted that true magnification is obtained since each display makes use of a full electron beam sweep for displaying a selected segment of the reflected signals received by the receiver 27.

In FIGURE 2F the situation is shown for 3 power magnification of the middle volume of water between the boat hull and the ocean floor. The output signal from the scan generator is thus delayed until time $t_3$ which is after 50% of the available time has elapsed. Then the sweep is made to take place in 30% of the total time interval available between adjacent signal transmissions. Three power magnification is therefore obtained with the magnification being of the approximate middle section of water lying between the boat hull and the bottom.

While many of the components shown in the block diagram of the system of FIGURE 1 are readily available, reference will now be made to FIGURES 3, 4 and 5 wherein the circuit details of preferred embodiments of specific circuits which have been found to work well in the system are illustrated. In FIGURE 3 the timing generator 10, delay generator 12, pulse generator 14 and transmitter 16 will be seen. The timing generator 10 is basically a free running sawtooth voltage generating circuit which provides the timing pulses 43 at the proper time intervals in accordance with the range settings for the equipment. The timing capacitor TC1 for the timing generator will be seen to be connected to the positive voltage terminal 109 and to the collector of a first NPN transistor 100. The emitter of transistor 100 is connected to signal ground through the resistors 101, 102 and 103 with resistor 102 being adjustable by means of the range switch RS2. The capacitor TC1 is also shown as being adjustable by means of range switch RS1. As described hereinafter, various ones of the control switches actually operate to connect different size capacitors and resistors in the circuit at various points but for simplicity of illustration many of such components are merely shown as adjustable components in order to simplify the description and illustrations. The base bias for transistor 100 is provided by resistors 104 and 105 which will be seen to be connected directly across the power supply. The bias is such that transistor 100 conducts and provides a charging path for the timing capacitor TC1. The capacitor will be seen to be connected to the emitter of a second NPN transistor 120 through the diode 121, the base of transistor 120 being maintained at a certain bias level by means of the resistors 122 and 123 connected across the power supply and having their common junction connected to the base of transistor 120. A third transistor shown as the PNP transistor 130 has its base connected to the collector of transistor 120, its collector connected to the base of transistor 120 and its emitter connected through the pulse transformer primary winding 131 to the positive voltage terminal 109.

The bias on the base of transistor 120 is set such that when the capacitor TC1 has charged to a voltage corresponding approximately to the voltage on the base of transistor 120, diode D1 will conduct and the transistor 120 as well as transistor 130 will also become conductive to provide a discharge path for the capacitor. This gives rise to a timing pulse in the secondary winding 132 of the pulse transformer with such timing pulse being applied to the delay generator and to the scan generator. When the capacitor has been discharged, transistors 120 and 130 become nonconductive and the capacitor again starts to charge through transistor 100. Thus it will be seen that the timing generator is esentially a free running sawtooth voltage circuit with the time between adjacent timing pulses in the secondary winding 132 being determined by the setting of the range switches RS1 and RS2.

The value of the resistors 104 and 105, as well as of the emitter resistance provided by resistors 101–103, is such that changes of emitter current in transistor 100 resulting from temperature changes will produce substantially complete self-compensation. In order to provide further temperature compensation and stability of the time between adjacent timing pulses an NPN transistor 110 having its emitter grounded through resistor 111 and its collector connected to the positive voltage supply through the collector resistor 112 will be seen to have its collector also coupled to the base of transistor 100 by the resistor 113. The base biasing resistors 114 and 115 place the collector of transistor 121 at the base voltage of transistor 100. Transistors 110 and 100 are of the same type and are maintained in the same thermal environment and therefore it will be seen that changes in the emitter current of transistor 100 which tend to occur as a result of temperature changes wil be offset by the changing bias applied to the base of transistor 100 as a result of the similar thermal induced current changes in transistor 100.

The trigger signal from the timing generator is applied to the base of a first NPN transistor 140 in the delay generator. The collector of transistor 140 will be seen to be coupled with the base of the second NPN transistor 150 in the delay generator by the delay generator timing capacitor DC1 which is shown as being adjustable by means of the range switch RS3. The timing resistor 142 is connected to the timing capacitor and to the positive power supply terminal 109 with said resistor being adjustable by the range switch section RS4. The primary winding 143 of a pulse transformer 144 is connected in the emitter circuit of transistor 140 so that an appropriate output pulse will be generated in the secondary winding 145 thereof for application to the pulse generator to be described.

It will be seen that the transistors 140 and 150 together with the timing capacitor DC1, timing resistor 142, and collector resistors 146 and 147 form a conventional triggered monostable multivibrator with transistor 150 being normally conductive and transistor 140 being normally nonconductive until a trigger signal is applied to the base thereof. When the positive portion of a timing signal from the timing generator is applied through capacitor 148 and resistor 149 to the base of transistor 140, transistor 140 will be rendered conductive causing a negative signal to be applied through the timing capacitor DC1 to the base of transistor 150 rendering transistor 150 nonconductive. After a length of time determined by the settings of the timing capacitor and timing resistor the circuit reverts to its original condition with transistor 150 conductng and transistor 140 nonconducting. When this occurs the abrupt termination of current flow from transistor 140 through the primary winding 143 gives rise to a negative pulse which is applied through capacitor 151 and resistor 152 to the base of the PNP transistor 160 in the pulse generator.

The pulse generator includes a pair of transistors 160 and 170 which are also connected in a monostable circuit arrangement. Transistor 170 is normally conductive and therefore since its collector is coupled with the base of transistor 160 by the resistor 161 the transistor 160 is normally held nonconductive. When the negative signal from the pulse transformer 144 is applied to the base of transistor 160 it becomes conductive and a positive pulse is applied from its collector by the capacitor 162 to the base of transistor 170. The states of conduction of the two transistors are therefore interchanged. The resulting positive pulse appearing on the collector of transistor 160 is also applied to the base of the NPN transistor 180. The emitter of transistor 180 is not only connected to ground by resistor 181 and capacitor 182 but is also coupled by a resistor 183 to the NPN transistor 190 in the transmitter.

The collector of transistor 190 is connected to the positive power supply terminal 109 by the capacitor 191 connected in parallel with the inductor 192 which serves as the primary winding for the power output transformer 193. The secondary winding 194 has output terminals 195 and 196 for driving a conventional transducer mounted beneath the hull of a ship. The base of transistor 190 is also connected to the positive power supply terminal by the series circuit arrangement of capacitor 197 and the inductor 198 which is in energy exchange relationship with the primary winding 192. Thus it will be seen that the transistor 190 and associated circuitry illustrated in FIGURE 3 comprise a continuous wave transmitter which is selectively gated on by a signal being applied to the base of transistor 190. The system makes use of low voltages throughout (in one system the voltage supply was a 12 volt supply). Since it is desirable to have substantial power in the output circuit of the transmitter, a large capacitor 199 is connected directly to the emitter of the transmitter transistor 190 to act as a large current source during transmitter operation. The emitter is also being connected to signal ground by the relatively low impedance resistor 185. The transmitter acts as a continuous wave transmitter, but is only periodically gated on by the output signal from the pulse generator. Thus the transmitter provides output energy for only very short time intervals. The large capacitor 199 is therefore able to store substantial energy during the relatively long time interval between successive operations of the transmitter, and hence is able to provide the necessary heavy current which makes possible the high energy output from the transmitter. In one system a 5,000 microfarad capacitor was used as the capacitor 199 with the transistor having been a 2N3055 type. The inductors 192 and 198 were each two turns of No. 12 wire with the capacitors 191 and 197 having been 2 microfarads and 0.47 microfarad, respectively. A 50 kc. output was provided to a transducer which imposed a 50 ohm load on the transmitter.

Referring now to FIGURE 4 the manner of operation of a preferred embodiment of the scan generator will be described. A pair of NPN transistors 200 and 210 have their collectors respectively coupled with the positive voltage supply by the collector resistors 201 and 211, their emitters connected directly to signal ground, and their base and collector electrodes respectively cross-connected by the resistors 202 and 212. The transistor 210 is normally conductive and therefore when the negative portion of the signal provided by the timing generator pulse transformer secondary winding 132 is applied to the base of transistor 210 through the resistor 203 and capacitor 204 transistor 210 will be rendered nonconductive. The rise in collector voltage of transistor 210 is applied to the base of transistor 200 so that transistor 200 now becomes conductive. The collector of transistor 210 is also directly connected to the base of NPN transistor 220 and therefore transistor 220 is rendered fully conductive.

The collector of transistor 220 is coupled with a timing circuit which is substantially the same as the circuit shown in FIGURE 3 for the timing generator. Thus it will be seen that the collector of transistor 220 is connected to the resistor 263 which together with resistors 264 and 265 provides a voltage divider bias arrangement for the base of NPN transistor 250. The collector of transistor 250 is connected to the base of PNP transistor 260 which has its emitter coupled with the positive voltage supply through the pulse transformer primary winding 266. The collector of transistor 260 is connected to the base of transistor 250 and to the adjustable tap 251 associated with resistor 264. The collector of transistor 220 is also connected to the resistor 241 which is coupled with the base of transistor 240 and to the resistor 242.

The collector of transistor 240 is connected to the positive voltage supply through the scan generator timing capacitor SC1 which is shown as being adjustable by means of the range switch RS5. A range switch RS6 will be seen to be connected to the collector of transistor 220 and is selectively positioned for connecting one of the resistors 245 or 246 in circuit with the emitter of transistor 240. The magnify controlled switch MS3 further serves to connect one or the other of resistors 243 or 244 in series circuit with the selected one of the resistors 245 or 246. Resistors 243 and 244 are adjustable by means of the scan control switches identified as SS1. While two switch positions have been shown here as well as in other places in the schematic circuit diagrams, it should be understood that a larger number of switch positions are provided in practice so that greater range, magnify, and scan selections can be made. As seen in FIGURE 4 the range switches RS5 and RS6 are adjusted to establish the basic limits for the charging time of the timing capacitor SC1. The magnify switch MS3 serves to adjust or select the resistors 243 or 244 in accordance with the magnification desired. Adjustment of the scan control switch SS1 is then used to determine which segment of the volume beneath the hull of the ship and the bottom of the ocean is to be magnified, as explained with reference to FIGURES 2A–2F. When there is to be zero magnification the magnify control switch MS3 is set to bypass the scan switch controlled resistors so that the delay produced by the scan generator corresponds to the delay produced by the delay generator and hence the output signals from the scan generator and from the pulse generator will occur at the same time. As the degree of magnification is increased larger resistors which are adjustable by the scan control switch are connected in circuit by the magnify control MS3.

As noted above, the circuit coupled with the collector of transistor 220 operates in a manner substantially the same as that described with respect to the timing generator of FIGURE 3. Thus the transistor 240 when rendered conductive by conduction of transistor 220 acts as an effective constant current source for the timing capacitor SC1 so that a negative going sawtooth voltage is generated. When the negative going voltage on the collector of transistor 240 reaches a point determined by the setting of the base voltage on transistor 250, the diode 255 conducts and transistors 250 and 260 conduct to thereby cause rapid discharge of the capacitor SC1. This generates an output trigger signal in the pulse transformer secondary winding 267 for the vertical sweep generator shown in FIGURE 5. The output circuit from the scan generator will also be seen to be connected by lead 268 back to the base of transistor 200. Therefore the negative going output signal from the scan generator is fed back to the base of transistor 200 to render it nonconductive. This in turn causes transistor 210 to become conductive and hence the circuit is reset to its original condition with transistor 220 being nonconductive and further output pulses are prevented until receipt of the next timing pulse.

The biasing of transistor 240, the voltage setting for conduction of diode 255, and the value of the emitter resistances for transistor 240 are chosen so that maximum output signal strength is achieved, and also to provide for temperature compensation in the manner described with reference to the timing generator of FIGURE 3. A temperature compensating network including the transistor 230 having its base coupled to the voltage divider network of resistors 234, 235 and 236 is also provided. The collector of transistor 230 will be seen to be coupled with the base of transistor 240 through fixed resistor 237 and the adjustable resistor 238. Also as in the case of the timing generator circuit, an additional diode is connected in parallel with the timing capacitor as a protection device in the event of a reverse voltage surge from the signal transformer.

In FIGURE 5 there is illustrated a preferred embodiment of the vertical sweep generator and associated vertical deflection coil drive circuitry. The vertical sweep generator makes use of a sawtooth wave generating circuit which is similar to that shown and described in FIGURE 3 for the timing generator, except that the vertical sweep generator operates in a triggered mode. Those components in FIGURE 5 in the sawtooth wave generating portion of the circuit which are similar to those in the circuit of FIGURE 3 bear like reference numerals but increased by a factor of 100. Thus it will be seen that a current control NPN transistor 300 is connected in circuit with the vertical sweep generator timing capacitor VSC1 which is adjustable by the range switch RS7. The range switch RS8 connected between ground and the adjustable resistors 302 and 303 serves to establish the maximum value for the timing resistance while adjustment of the value of resistor 302 or 303 is controlled by the magnify control switches MS1. In practice a greater number of the variable resistances would be provided in order to accommodate greater variation of the magnification at many ranges, but in order to simplify the description hereof the circuit shown in FIGURE 5 includes two of the adjustable resistors. It will be seen that the sweep generator circuit includes a pair of transistors 320 and 330 which correspond in general to the transistors 120 and 130 in the circuit of FIGURE 3. The base of transistor 320 is connected by an adjustable tap 321 to the resistor 324 which is in turn connected to the positive voltage supply and to ground by resistors 322 and 323. The bias provided on transistor 320 and on the diode 325 by the resistor network 322–324 is such that a trigger signal is needed on the base of transistor 320 to render it conductive with capacitor VSC1 charged.

Temperature compensation is also provided by the transistor 310 and associated resistors 311–316 in the manner described for the corresponding components in FIGURE 3. An adjustable tap is provided on the resistor 318 for adjusting the voltage level applied to the base of transistor 300 from the collector of transistor 310. Linearity of the sawtooth voltage derived from the capacitor VSC1 is extremely important and therefore the sweep generator includes a feedback circuit which corrects for any leakage which tends to occur.

The sawtooth voltage from the capacitor VSC1 is applied to the base of transistor 340 which will be seen to be connected in an emitter-follower configuration. This avoids substantially all loading of the capacitor VSC1. In order to further reduce the load values four additional emitter-follower stages are provided by transistors 350, 360, and 370. It will be seen that the voltage on the emitter of transistor 370 will follow the voltage on the capacitor VSC1. The emitter of transistor 370 is connected to the base of a first sweep control transistor 410 in the vertical deflection coil drive circuit of the sweep generator. The emitter of transistor 370 is also connected through resistor 371 to the base of the signal inverting transistor 380 which has its collector connected to the base of the emitter-follower stage provided by NPN transistor 390, which is in turn cascaded with a second emitter-follower provided by the NPN transistor 400. The emitter of transistor 390 is connected through resistor 391 and the feedback resistor 392 to the base of the transistor 300 which controls the charging current for timing capacitor VSC1. Since the transistor 380 acts to invert the signal appearing on the emitter of transistor 390 with respect to the voltage on capacitor VSC1, and since current control transistor 300 is of the NPN type, it will be seen that positive feedback is provided which therefore tends to maintain the charge rate of capacitor VSC1 very linear with respect to time. Since the degree of feedback necessary in order to maintain linearity differs in accordance with the charge rate it will be seen that resistor 392 is adjustable in magnitude and is under the control of the magnify switch MS2. As the charge rate for the capacitor is decreased the proportion of leakage and loading effects increases. Therefore more positive feedback is provided as the charge rate is decreased.

The emitter of transistor 400 will be seen to be connected directly to the base of a first deflection coil current control transistor 420 which is of the NPN type and has its collector connected directly to the V+ power supply and its emitter connected through adjustable resistor 422 to the emitter of the PNP current control transistor 440. The base of transistor 440 is connected to the emitter of transistor 400 by means of the adjustable tap 441 which engages the emitter resistor 401 for transistor 400. In a similar manner the emitter of transistor 410 will be seen to be directly connected to the base of NPN transistor 430 which has its emitter connected through variable resistor 432 to the emitter of the PNP transistor 450. The base of transistor 450 is connected to the adjustable tap 451 which is in engagement with the resistor 411 connected to the emitter of transistor 410. Thus it will be seen that a symmetrical arrangement is provided with the transistor 400 serving to control transistors 420 and 440 and transistor 410 serving to control transistors 430 and 450.

The cathode ray tube (CRT) used in the system is of the magnetic deflection type and thus there is illustrated in FIGURE 5 the deflection coil 460 which controls the vertical positioning of the beam. The deflection coil will be seen to be connected directly between the emitters of transistors 440 and 450 by one or the other of the variable resistor 461 or 462 depending on the setting of the range control switch RS9. The setting of the resistance of the individual resistors 461 and 462 is controlled by the magnify control switch MS4.

The operation of the circuit in FIGURE 5 is as follows. Assuming the circuit to be in the condition with timing capacitor VSC1 charged, the application of a pulse to the base of transistor 320 from the scan generator via capacitor 328 causes transistor 320 to be conductive and hence the timing capacitor VSC1 discharges and then starts to charge through current control transistor 300. Thus a negative going sawtooth voltage is applied to the base of transistor 340. The emitter-follower stages of transistors 350, 360 and 370 result in the application of a negative going sawtooth voltage to the base of transistor 410 while simultaneously a positive going sawtooth voltage is applied to the base of transistor 400 (as a result of the signal inversion provided by transistor 380).

Assuming a point in time just prior to the receipt of a signal from the scan generator, the beam will be at the top of the screen with transistor 430 and 440 being conductive, the holding current for the vertical deflection coil thus being provided from transistor 430, through the coil, and thence through transistor 440 to ground. This follows from the fact that transistor 410 at such time is fully conductive and therefore maintains transistor 430 conductive and holds transistor 450 against conduction. In a similar manner the nonconductive state of transistor 400 serves to hold transistor 420 nonconductive and permits conduction of transistor 440. When the scan generator signal starts the negative going sawtooth voltage of the vertical sweep generator, the emitter of transistor 410 will start to go negative in the manner previously described and simultaneously the emitter of transistor 400 will start to go positive. Therefore the degree of conduction of transistors 430 and 440 will start to decrease. However, transistors 420 and 450 will not start to conduct immediately since it will be seen that due to the heavy state of conduction of transistor 440, as determined by the base voltage thereon established at resistor 401, the base-emitter potential on transistor 420 is not immediately sufficient to render transistor 401 conductive. For the same reason it will be seen that the bias provided on transistor 450 by resistor 411 is not immediately sufficient to cause transistor 450 to conduct. As the current flow through transistors 430 and 440 decreases, the beam reaches its point of zero deflection and at this point in time or slightly before that point transistors 420 and 450 start to conduct. The taps 441 and 451 on resistors 401 and 411 are adjusted so that just prior to the time when transistors 430 and 440 become nonconducting the transistors 420 and 450 become conductive and accordingly when the transistors 430 and 440 do become nonconducting as the beam reaches its zero position the transistors 420 and 450 are already conducting and a reversal in the flow of current through deflection coil 460 occurs in a very smooth manner without any tendency for the zero deflection condition to assume a definite length of time.

The importance of adjustable resistor 422 and the adjustment of tap 441 for transistors 420 and 440 now becomes apparent since it will be seen that these two adjustments establish the voltage differences as applied to transistors 420 and 440 as the state of conduction of transistor 400 follows the sawtooth voltage of capacitor VSC1 in the positive going direction. In a similar manner a resistor 432 and the tap 451 are adjusted so that the voltage differences applied to transistors 430 and 450 will result in the smooth transition described above. If the setting of tap 441 alone was relied on for adjustment of turnon and turnoff of 420 and 440, it would be found that as transistor 400 becomes fully conductive the bias differential applied to 420 and 440 would change so that a greater voltage difference would be provided at full sweep. This would of course tend to turn transistor 420 on to a greater degree and thereby create current flow which could be of considerable proportion directly through transistors 420 and 440 in addition to the current flow through the deflection coil and transistor 450. Resistor 422 does nothing during the first half of the sweep (to the point of zero deflection) since transistor 420 is nonconducting. However, as transistors 420 and 450 start to conduct, resistor 422 has a current flow therethrough and provides a voltage drop in proportion thereto. This causes the emitter of transistor 440 to become positive at a lesser rate than if resistor 422 was not present. The presence of resistor 422 tends to hold the emitter of transistor 440 slightly more negative than it would otherwise be and hence serves to maintain it in a cutoff condition after the point of zero deflection has been reached. The resistor 422 is adjusted to the point so that it has sufficient voltage drop due to the load current therethrough to exactly offset the effect of the increasing positive bias difference applied by resistor 401 and voltage tap 441 to the transistors 420 and 440. Resistor 432 does exactly the same thing for transistors 430 and 450 and hence the beam undergoes a smooth transition through the zero deflection point.

The range switch RS9 serves to insert the proper value of resistance in series with the coil 460 for each range setting. In addition, the magnify control switch MS4 provides a fine adjustment of the value of such resistance as the beam sweep is speeded up or slower down in accordance with the degree of magnification.

The horizontal sweep generator operates in a manner substantially identical to that of the vertical sweep generator except that the horizontal sweep generator operates in a free running mode rather than in a triggered mode. The range switch serves to control the time constants for the horizontal sweep generator. As the boat carrying the system moves through the water the beam is thus repeatedly scanned in the horizontal direction by the horizontal sweep generator and simultaneously the beam is scanned from top to bottom by the vertical sweep generator. The intensity of the beam is controlled by conventional video control circuits responding to the reflected energy picked up by the receiver 27. While it is not essential to correlate the boat's speed with the horizontal beam sweep speed, it is obvious that such could be done.

It has been found in practice that multi-wafer switch assemblies work well for changing the various capacitance and resistance values in the system. In one such system the range switch and the magnify control switch each took the form of a six wafer switch assembly having two sections per wafer and six positions per section. The scan control was a single potentiometer for changing the secondary resistance elements 243-244 in the scan generator. This system provides 1X, 2X, 3X, 5X, 7X and 10X magnification and range selections of 50 feet, 100 feet, 250 feet, 500 feet, 1000 feet and 2500 feet.

From the above it will be seen that the system provides capabilities which heretofore have not been possible in the depth finding arts. For the first time a person is able to magnify to a selected extent any selected volume within a fixed range. Thus the ability to first detect objects such as schools of fish within a general coarse range and then the ability to view on an enlarged scale the specific school first detected on the coarse range is made possible. The system is extremely simple in that as the boat moves along the water a continuous display of the bottom and of intervening objects is continuously provided. Movement of the transducer relative to the ship is not required and also due to the extremely linear characteristics of the horizontal sweep generator circuit (substantially the same as that in the vertical sweep generator circuit) it is possible to have a low cost system which provides accurate information regardless of boat speed.

There has thus been disclosed an improved detection and display system which permits the presentation of detailed information regarding underwater objects and the contour of the bottom of the ocean over which a craft is moving. While the invention has been disclosed in detail with reference to an underwater system for use with a ship, it is obvious that the inventive concepts are equally applicable using radar techniques in a system carried by a plane.

While the system has been disclosed by reference to a presently preferred embodiment, it is intended that those modifications in the system and in the novel circuits disclosed herein which become obvious to a person skilled in the art as a result of the teachings hereof will be encompassed by the following claims.

What is claimed is:

1. A detection and display system comprising in combination: cathode ray display means including a horizontal sweep generator, a vertical sweep generator providing a vertical sweep signal having a maximum sweep time which is a small fraction of the horizontal sweep time, and video control means; timing signal generator means providing periodic timing signals; transmitter means; first circuit means coupled with said timing generator means and with said transmitter means to render said transmitter means operative for transmission of an interrogation signal in response to a timing signal; signal receiver means providing output information signals in response to receipt of reflected portions of an interrogation signal; second circuit means coupling said receiver means with said video control means to control the intensity of the beam in accordance with said information signals; third circuit means coupled with said timing generator means and with said vertical sweep generator means rendering said vertical sweep generator means operative at a selectively variable time following the occurrence of a timing signal from said timing signal generator means; and means for varying the duration of the vertical sweep signal provided by said vertical sweep generator, whereby reflected signals received by said receiver means during a selected portion of the time interval between adjacent timing pulses control the intensity of the beam in said display means during a complete vertical sweep thereof.

2. A system as defined in claim 1 wherein said transmitter means comprises a gated continuous wave oscillator and an underwater transducer coupled therewith.

3. A system as defined in claim 1 wherein said third circuit means comprises scan signal generator means having an adjustable first resistor-capacitor timing circuit for controlling the time delay between occurrence of a timing signal and operation of said vertical sweep generator; said means for varying the duration of the vertical sweep signal including an adjustable second resistor-capacitor timing circuit in said vertical sweep generator; range switch means coupled with said first and second resistor-capacitor circuits; and magnify switch means coupled with said first and second resistor-capacitor circuits.

4. A system as defined in claim 3 wherein said scan signal generator means includes a first sawtooth voltage generator having said first resistor-capacitor circuit as its timing circuit, and said vertical sweep generator includes a second sawtooth voltage generator having said second resistor-capacitor circuit as its timing circuit.

5. A system as defined in claim 1 wherein said cathode ray display means is a cathode ray tube having a magnetic beam deflection coil, and wherein said vertical sweep generator comprises current control means in series circuit with said coil and a sawtooth voltage generator coupled with said current control means.

6. A system as defined in claim 5 including a variable impedance element in series circuit with said coil, and switch means for simultaneously adjusting said sawtooth voltage generator and said impedance element.

7. A system as defined in claim 1 wherein said first circuit means includes a delay signal generator rendering said transmitter means operative at a first time following occurrence of a timing signal; said third circuit means includes a scan generator having selectively variable timing means for delaying the operation of said vertical sweep generator until a selected time after said first time; said vertical sweep generator includes a timing circuit; and said means for varying the duration of the vertical sweep signal includes means for adjusting said timing circuit.

8. A system as defined in claim 7 wherein said cathode ray display means is a cathode ray tube having a magnetic beam deflection system including a vertical deflection coil, said vertical sweep generator includes a sawtooth voltage generator, and coil current control means connected to said sawtooth voltage generator for control thereby and with said coil for controlling the flow of current therethrough.

9. A system as defined in claim 8 and including range switch means coupled with said timing means and with said timing circuit for simultaneous adjustment of the time of operation of said vertical sweep generator and the length of time for the occurrence of a vertical sweep signal.

10. A system as defined in claim 9 and including magnify switch means coupled with said timing means and with said timing circuit for simultaneous adjustment thereof.

11. A system as defined in claim 10 wherein said sawtooth voltage generator includes variable feedback circuit means for maintaining the output voltage thereof linearly related to time, and wherein said magnify switch means is coupled with said variable feedback circuit means for adjustment thereof.

12. A system as defined in claim 7 and including range switch means coupled with said timing generator, said scan generator, and with said vertical sweep generator and operative to simultaneously adjust the spacing of said time signals, the upper limit on the time delay for initiation of said vertical sweep signal, and the upper limit on the duration of each vertical sweep signal.

13. A system as defined in claim 12 and including magnify switch means coupled with said scan generator and with said vertical sweep generator for simultaneously adjusting the delay for occurrence of a vertical sweep signal and the duration thereof.

14. A system as defined in claim 13 wherein said timing generator, said scan generator, and said vertical sweep generator each includes a resistance-capacitance timing circuit and wherein said range and said magnify switch means each respectively adjusts the capacitance and the resistance of each of said timing circuits.

15. A system as defined in claim 14 and including scan switch means coupled with said scan generator for further adjusting the said timing circuit thereof.

References Cited

UNITED STATES PATENTS 2,580,977   1/1952   Tourshow et al. _____ 315—27
2,925,580   2/1960   Schumacher _____ 340—3

FOREIGN PATENTS 500,809   2/1939   Great Britain.
111,632   10/1940   Australia.

RODNEY D. BENNETT, JR., Primary Examiner.

J. G. BAXTER, Assistant Examiner.

U.S. Cl. X.R.

315—19, 27; 340—3